United States Patent [19]

Few et al.

[11] Patent Number: 5,570,924
[45] Date of Patent: Nov. 5, 1996

[54] SCISSORS ACTUATED TRAILER SLIDE-OUT

[75] Inventors: Jeffrey P. Few, Elkhart; Bernard F. Garceau, Granger, both of Ind.

[73] Assignee: Norco Industries, Inc., Compton, Calif.

[21] Appl. No.: 393,654

[22] Filed: Feb. 24, 1995

[51] Int. Cl.⁶ ........................................................ B60P 3/34
[52] U.S. Cl. .............................. 296/175; 52/67; 296/26; 296/171
[58] Field of Search ............................... 296/26, 162, 165, 296/171, 172, 175, 176; 52/67

[56] References Cited

U.S. PATENT DOCUMENTS

| | | |
|---|---|---|
| 1,513,227 | 10/1924 | Cornelius et al. |
| 2,561,921 | 7/1951 | Guillot . |
| 2,729,497 | 1/1956 | Runyan . |
| 3,341,986 | 9/1967 | Brosig . |
| 3,582,130 | 6/1971 | Borskey . |
| 4,055,329 | 10/1977 | Hammond . |
| 4,133,571 | 1/1979 | Fillios . |
| 4,148,461 | 4/1979 | Orth . |
| 4,509,724 | 4/1985 | Okada . |
| 4,715,480 | 12/1987 | Anderson . |
| 4,720,082 | 1/1988 | Yang . |
| 5,054,578 | 10/1991 | Smillie, III et al. . |
| 5,154,469 | 10/1992 | Morrow ................................ 296/175 |
| 5,237,782 | 8/1993 | Cooper . |
| 5,248,180 | 9/1993 | Hussaini . |
| 5,332,276 | 7/1994 | Blodgett, Jr. ....................... 296/175 |

FOREIGN PATENT DOCUMENTS

| | | |
|---|---|---|
| 1107260 | 8/1955 | France .................................. 296/171 |
| 2244031 | 11/1991 | United Kingdom .................... 296/26 |

*Primary Examiner*—Dean Kramer
*Attorney, Agent, or Firm*—Fulwider Patton Lee & Utecht, LLP

[57] ABSTRACT

A scissors actuated slide-out apparatus including a slidably expandable and retractable slide-out frame cooperating with a parent RV main frame to form a drive compartment into which is mounted a powered scissors drive mechanism including a plurality of scissors linkages pivotally joined with a drive screw interposed between opposing pivots such that rotation of the screw expands or retracts the scissors thereby expanding or retracting the slide-out. The drive mechanisms' extruded nature enables relatively simple installation and removal as well as cost efficient maintenance thereof.

16 Claims, 3 Drawing Sheets

5,570,924

SCISSORS ACTUATED TRAILER SLIDE-OUT

BACKGROUND OF THE INVENTION

1. Field of the Invention

The invention relates to recreational vehicle slidable rooms and more particularly to a slidable room driven by a scissors actuated sliding support mechanism capable to collapse and retract a sliding room support frame.

2. Description of the Prior Art

Recreational vehicles (RVs) offer users the opportunity to escape the rigors of everyday life and explore the world we live in. Resembling a small home on wheels, an RV is capable of transporting and comfortably sheltering a family for extended periods of time. The primary benefit of such a vehicle is to enhance the camping or traveling experience by providing the comforts of home away from home. Additionally, the occupant is given the option of braving the elements, commonly known as "roughing it", or retreating to the protection afforded by the RV. Thus the spirit of "roughing it" may be maintained without deprivation of the full camping experience.

Although freely mobile, as the size of RV's increase, the ease of handling tends to decrease. Responding to the need for more living space inside a smaller vehicle, numerous different RVs have been proposed with pop-up tops and slide-out rooms for selectively expanding the living area. Designed to be used only when the RV is parked, the assemblies generally slidably expand or retract from the side, rear or roof of the vehicle to form an extra access area, or room therewithin.

Variations on the idea of "popping" out a compartment to provide extra space within a vehicle have been disclosed. These compartments are often characterized by collapsible side walls terminating in an end wall with a mechanism to push out or pull in the walls. Such assemblies usually offer extra space only and are often not provided with a lower structural support framework to provide a true living space. One such variation on this general scheme was disclosed by the 1924 U.S. Pat. No. 1,513,227 to Cornelius et al, wherein a hand operated scissors network was used to manually extend and contract an accordion-like walled compartment. Although beneficial for use in automobiles of that era, such devices are not practical for recreational vehicle use since they do not provide support and driving force for practical use in deploying an RV room to be occupied by the vehicle occupants. Other variations in "popping top" schemes are illustrated in U.S. Pat. Nos. 2,561,921 to Guillot and 3,582, 130 to Borskey.

In recognition of the need for a practical slide-out room, several different devices have been proposed. Included among those proposed are expandable camper bodies and enclosures (U.S. Pat. Nos. 4,133,571 to Fillios and 5,248, 180 to Hussaini), and a slidable room assembly for RVs (U.S. Pat. No. 5,237,782 to Cooper). Envisioned for recreational vehicle use, these slide-out devices generally include accordion-like side walls laterally joined to a rigid end wall. Supporting the walls is a slidable frame carried from the main RV frame to slidably extend and retract from and within the main RV frame. A manually operated or motorized driving mechanism interconnects between the sliding frame and the main frame for expansion and retraction of the slide-out.

The trend in the RV industry over the last several years with regards to slide-out rooms has been to incorporate the entire slide-out assembly within the RV parent main frame. This development, as illustrated by the Cooper patent, has led to more feature inclusive mechanisms since any environmental effects from outside the parent frame during non-use are avoided. However, drive mechanisms associated with these assemblies have often correspondingly become more complex with the costs of repair and replacement correspondingly more substantial. This is due to the fact that access to the drive mechanism for the purpose of repair is often severely restricted thus adding to the time required for repair and maintenance thereby driving up the cost of repair.

Prior art driving mechanisms for RV slide-out rooms function in many different forms and generally share many of the same functional and structural characteristics. One such form uses toothed geared drive assemblies having racks or pivoted members which expand or contract upon rotation of a toothed gear. Devices of this type are disclosed in the Fillios and Hussaini patents. Other variations of slide-out drive mechanisms involve the use of threaded drive screws to drive racks and pivoted cross members as shown in U.S. Pat. No. 5,054,578 to Smillie, III et al. and the '782 Cooper patent.

Further efforts to provide a practical drive for slide-out rooms have led to the proposal of hydraulic cylinders. Resembling horizontally installed hydraulic jacks, these mechanisms slidably force the room open as the hydraulic room is extended and slidably close the room as the room contracts. Although straightforward in design, hydraulic systems often tend to be fragile in nature and, being subject to deleterious rigors of vibration in the transport of the RV over the roadway, can experience a relatively short service life. Additionally, activation of such systems is often from outside of the vehicle, thus exposing the operator to potentially adverse environmental conditions.

Alluded to above, a characteristic often shared by prior art drive mechanism designs is the intended location of the operating mechanism. Slide-out driving mechanisms are often installed as original equipment during manufacture of the RV. Termed "OEM" equipment, the installation locations of these devices are often chosen without consideration of the fact that it may be desirable to subsequently gain access to such mechanisms for repair and/or replacement. As a result, the devices are often incorporated within the confines of the RV main frame making repairs costly and replacement nearly impossible.

From the foregoing discussion, it is apparent to those skilled in the art that the need exists for a straightforward, low cost, reliable, and modular slide-out recreational vehicle room capable of OEM and aftermarket installation and replacement.

SUMMARY OF THE INVENTION

The RV room slide-out apparatus of the present invention is inexpensive, reliable and provides for ease of replacement for the drive mechanism. Having relatively few component parts and subassemblies, the present invention is inexpensive to manufacture and repair. Maintenance costs are minimized due to the rugged design and easy accessibility. Moreover, since the driving unit is external to the confines of the RV main frame, the driver may be installed after market as well as in an OEM fashion.

The invention includes a retractable slide-out frame carried from the RV main frame. The slide-out frame comprises slide beams projecting telescopically from the respective cross beams. The cross beams are an integral part of the RV main frame and may carry support rollers on which the slide members roll. Mounted from the distal ends of the slide beams is a longitudinal slide-out beam.

Expanding and retracting the slide-out frame is a lazy tongs type scissors actuated driving device. This device includes a plurality of scissors linkages pivotally joined. A drive screw is interposed between two aligned pivots such that rotation of the screw will draw the pivots together or push them apart, thus expanding or contracting the scissors linkages. Aligned parallel to the RV main frame, the drive screw is conveniently situated between the longitudinal support beams of the sliding frame. Optionally, a twelve volt DC motor may be provided to act through a gear box to rotate the drive screw. The motor/gearbox assembly is conveniently mounted to the pivot through which the jackscrew extends to thus provide an individual modular unit for ease of repair and replacement.

Other features and advantages of the invention will become apparent from the following detailed description, taken in conjunction with the accompanying drawings, which illustrate by way of example, the features of the invention.

DETAILED DESCRIPTION OF A PREFERRED EMBODIMENT

Currently available recreational vehicle slide-out room drive mechanisms generally comprise a collapsible apparatus capable of expanding or retracting a collapsible frame supporting a slide-out room. Often, the devices include mechanically joined pivoting links secured within guide rails to expand or contract on command, thereby pushing or pulling the room away from or towards the vehicle. Some designs incorporate hydraulic systems for this purpose. However, prior art drive mechanisms are often constructed to be installed at the time of manufacture without the concern for the prohibitive cost of repairs or replacements. The present invention offers a sturdy device, conveniently mounted within a slide-out compartment and easily removable therefrom as a modular component to thus provide for efficient and inexpensive repair and replacement of slide-out room driving mechanisms.

Figure 1:
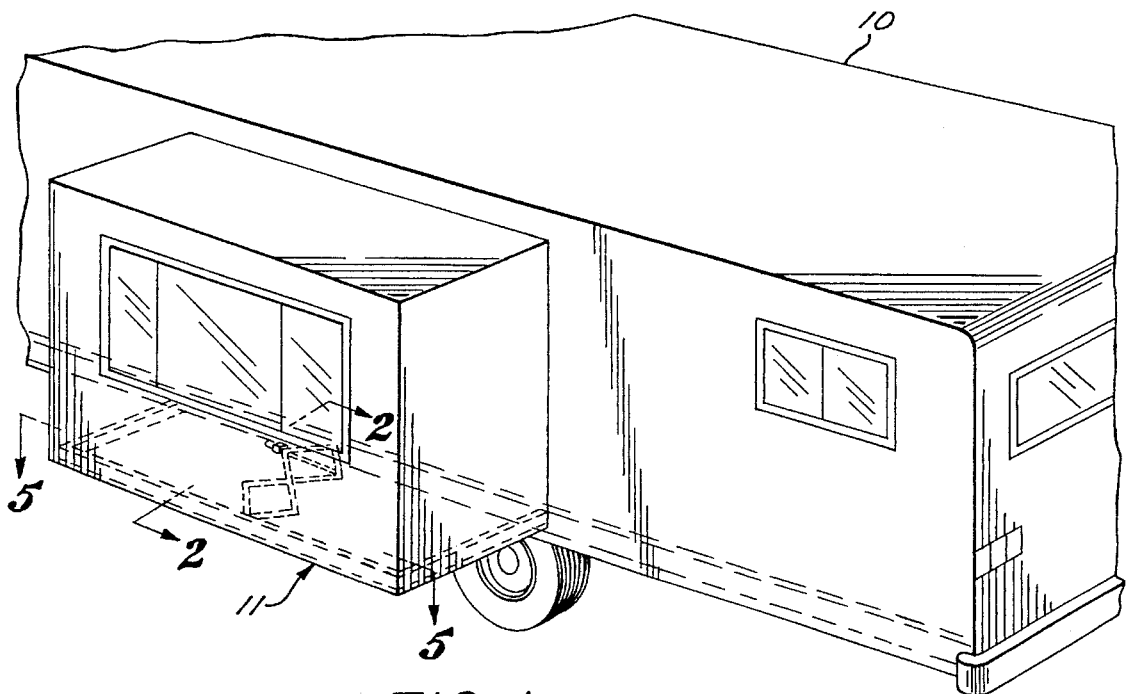
FIG. 1 is an elevated perspective view of an RV slide-out room incorporating the present invention.
Figure 5:
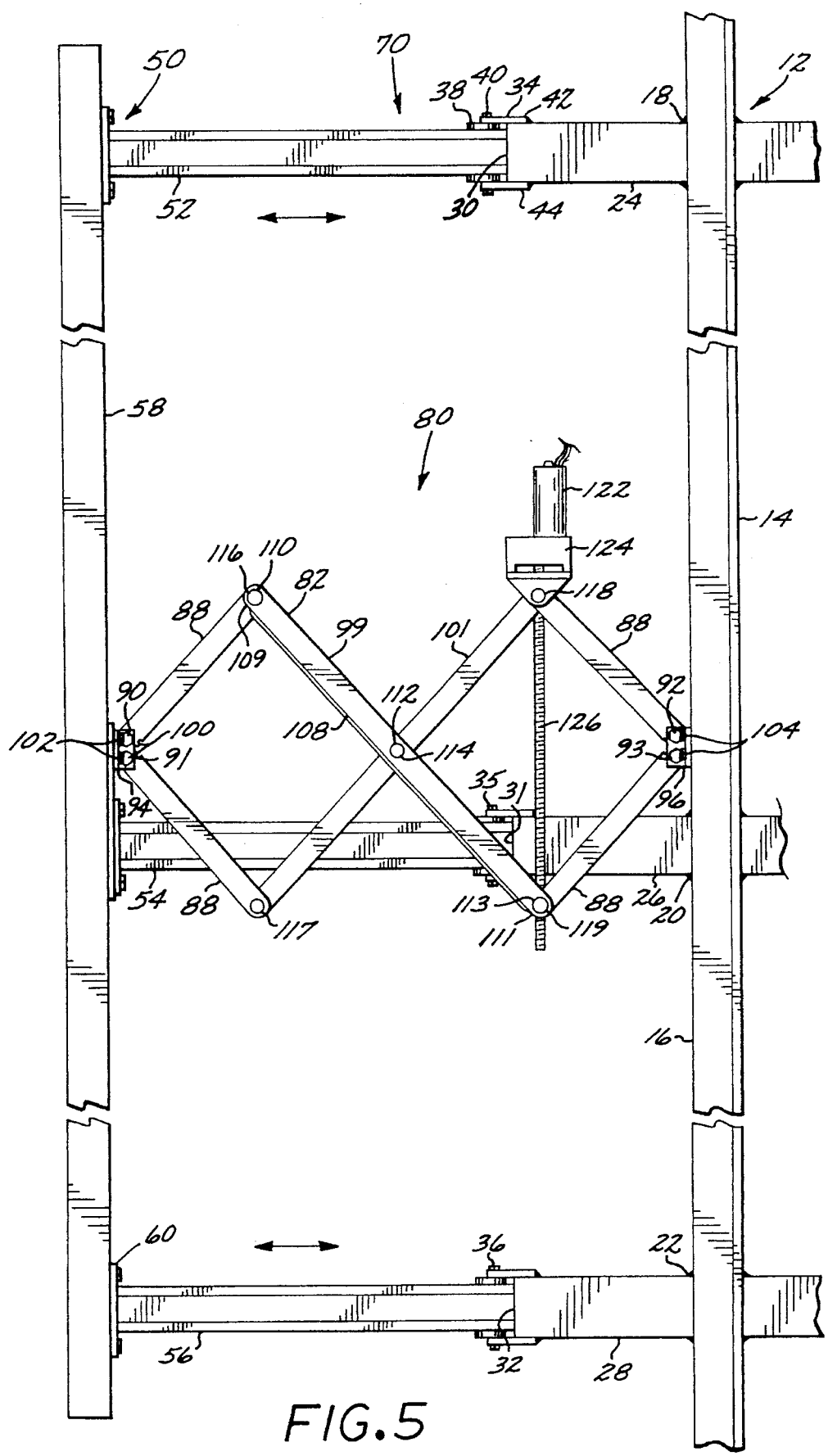
FIG. 5 is an elevated view of the present invention taken along line 5—5 of FIG. 1.

As shown in the drawings for purposes of illustration, the invention in a preferred embodiment is a scissors actuated trailer slide-out apparatus interposed between a slide-out frame and main frame of a recreational vehicle, hereinafter referred to as an RV. Referring to FIGS. 1 and 5, generally, an RV 10 is equipped with a slide-out room 11 having a slide-out support structure 12 consisting of open ended tubular cross beams 24, 26 and 28 incorporated in a longitudinal main frame. Extendable telescopically from such beams 24, 26 and 28 are respective slide beams 52, 54 and 56 carrying on their distal ends a longitudinal slide-out beam 58 to cooperate in defining a drive compartment 70. Extending and retracting the sliding frame is a drive kit 80 comprising a powered scissors linkage 82 of the lazy tongs type. Rotational power is supplied by a drive motor 122 and transferred through a gear box 124 to a drive screw 126 interposed between two pivots 118 and 119, thus actuating the drive kit.

Figure 2:
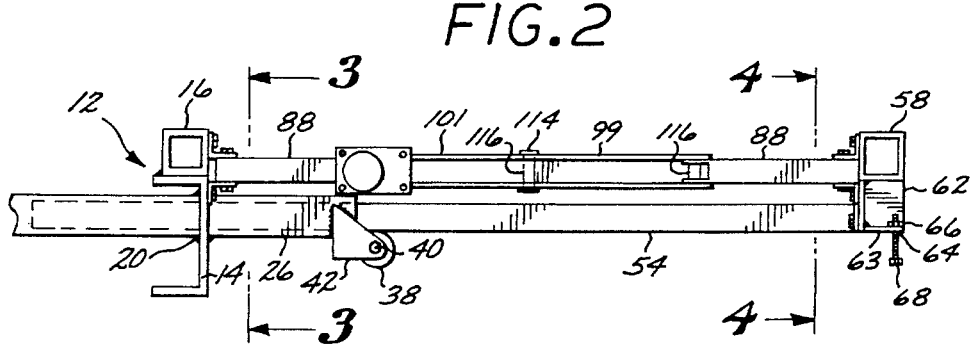
FIG. 2 is an enlarged transverse sectional view taken along line 2—2 of FIG. 1.
Figure 3:
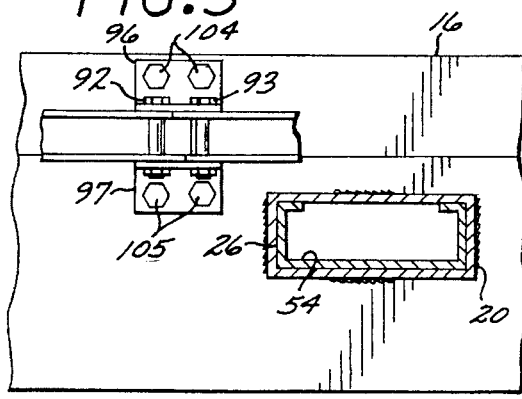
FIG. 3 is an enlarged partial transverse sectional view taken along line 3—3 of FIG. 2.

Referring to FIGS. 2, 3 and 5, the RV main frame 12 includes a longitudinal main frame channel beam 14. The main frame channel beam extends the length of the RV 10 longitudinally and opens laterally inwardly. Sitting on top of the upper surface of the main frame beam, and running parallel therealong, is a square tubular drive support member 16. Such member serves to provide a mounting base for a slide-out drive mechanism. Opening laterally from the main frame beam are three rectangularly formed ports 18, 20 and 22 in spaced relation for receipt therein of three tubular cross beams 24, 26 and 28. The cross beams are affixed perpendicularly through the longitudinal main frame beam ports and have rectangular cross sections and open ends.

Mounted under the respective openings 30, 31 and 32 of the cross beams 24, 26 and 28 are respective roller assemblies 34, 35 and 36 in the form of respective cylindrical rollers 38 carried on respective axles 40 suspended endwise from two triangular mounting plates 42 and 44. The plates are affixed to the cross beam end with the roller and axle interposed therebetween such that the axle lies parallel to the main RV longitudinal beam 14 and the upper rolling surface flush with the respective top surfaces of the bottom walls of the respective cross beams. It will be appreciated that such roller assemblies will serve to support the respective sliding frames as they slide-out and retract into the respective tubular cross beams 24, 26 and 28, thereby minimizing any lateral stresses imposed on the driving mechanism 80 due to asymmetrical operation.

The lateral slide beams 52, 54 and 56 are in the form of upwardly opening channels configured to be telescopically received in the laterally opening ends of the respective main frame cross beams 24, 26 and 28. Welded to the distal ends of the respective slide beams are rectangular mounting plates 60 which serve to mount against the lateral side of the slide beam 58 with mounting bolts 53, 55, 57 and 59. Together, the lateral slide beams and the longitudinal slide beam comprise a slide-out frame 50.

Figure 4:
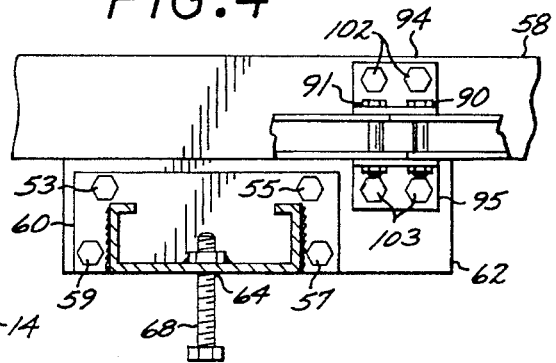
FIG. 4 is an enlarged partial transverse sectional view taken along line 4—4 of FIG. 2.

Referring to FIGS. 2 & 4, carried from the far ends of the slide-out beams are respective support housings 62 which include respective bottom walls 63 formed with respective vertical through bores 64. Aligned with the top of such bores are respective nuts 66 welded to such bottom walls for receipt of respective stop bolts 68 to engage the respective rollers 38 to limit retraction of such slide-out beams.

With particular reference to FIG. 5, designed to be interposed between the longitudinal drive mechanism member 16 and the longitudinal slide beam 58 is a modular slide-out drive kit 80 comprising a scissors like framework 82 coupled to an electric motor 122. The motor delivers rotational power, which is reduced through a gearbox 124, to a drive screw 126 which in turn cooperates with two scissors pivots 118 and 119 to expand and retract the scissors frame. The drive kit is fully confined within the drive compartment 70 thereby allowing ease of access for repairs and replacement.

The scissors framework 82 is a combination of what is generally termed a "lazy tongs" device and a "scissors jack"

like mechanism. Comprising pivotally joined scissors link members, the framework in the preferred embodiment includes two opposed pairs of one-piece channels defining arms 88 interposed pivotally by two pairs 102 and 104 of elongated parallel spaced scissors members (FIG.2). The arms 88, respectively, are formed with a U-shaped cross section and extend approximately twelve inches.

Referring to FIG. 5, the proximate ends of the arms 88 are semi-circular and mount respective meshing gear teeth 100 concentric with respective pivot bores receiving respective mounting bolts 90, 91, 92 and 93 (FIGS. 3 and 4). The mounting bolts which mount such arms to respective mounting angles 94, 95, 96 and 97 secured to the respective main beam 14 and extendable beam 58 with respective pairs of securing bolts 102, 103, 104 and 105. The two ends are pivotally joined to hold the gear teeth meshed together during rotation of the arms about the respective pivot axes. Keeping the channeled arms separately pivoted in this fashion provides for balanced loading of the scissors framework.

It will be appreciated that meshing of the geared teeth 100 at the channeled arm ends is designed to restrict the arms 88 to a vertical line of movement, thus relieving stress from other areas of the device. In addition, the teeth provide for improved incremental control of the drive mechanism during expansion and retraction.

With continued reference to FIG. 5, interposed pivotally between the short distal arms 88 are respective pairs of long scissors links 99 and 101 (FIG.2) formed along the respective one edged narrow upturned reinforcement flanges 108 and configured at their opposite ends with devices terminating in respective rounded ends 109 and 111. Formed concentric with the rounded ends of the strips are pivot bores 110 and 113 for receipt of respective pivot pins to pivotally secure the strips to the shorter arms 88. A pivot aperture 112 is also formed medially into the elongated links 99 for joinder therebetween. Each pair of elongated links is joined medially such that the upturned edges face away from each other, then the two joined pairs are connected together at the same medial location with a common pivot screw 114. A protective sheath 116 (FIG. 2) coaxially covers the pivot screw. The resulting "X"-shaped assembly is then pivotally connected by pivot pins 116, 117, 118 and 119 at each free end of arms 88 to complete the framework 82. The pivot pin 118 is formed with a through, transverse clearance bore for passage of the drive rod 126 and the pin 119 mounts a threaded nut for threadably engaging such rod.

Powering the framework 82 is a motor driven drive screw assembly having a reversible 12VDC motor 122, a gear reduction assembly 124, and a threaded drive screw 126 (FIG. 5). The motor is a standard 12 VDC reversible motor having a rotational shaft output well known to those skilled in the art. Coupled to the rotational output of the motor is a gear reduction assembly having a plurality of serially joined gears of different sizes to provide a rotational output having a reduced angular velocity with respect to the motor output. Having one end directly coupled to the gear reduction assembly output, the drive screw is threadably interposed between the bored end pivots 118 and 119 of the scissors framework 82. Receiving the drive screw are two threaded inserts (not shown) set in line on opposite sides of the pivots for shaft support.

It will further be appreciated that the motor runs off a 12 volt source and thus is compatible with a standard 12 volt car battery. Wires running directly from the "+" and "−" terminals of a car battery may be harnessed along the slide-out frame beams and terminated at the power inputs of the motor. "Extend", "contract" and "neutral" switching capability is easily provided by installing a simple three position reversible polarity switch at any point in the harnessed circuit. The switch setting in an "extend" position provides +12 VDC to the motor, while the switch in a "retract" position supplies −12 VDC to the motor. A "neutral" switch position effectively disconnects power from the motor.

Set slightly above the sliding beams 52, 54 and 56 of the slide-out frame 50, the drive mechanism is disposed clear of the slide-out frame and is sufficiently elevated from the ground to minimize exposure to most water and mud splashing typically generated by RVs during travel. The drive screw 126 is positioned parallel to the longitudinal beams 58 and 16 so as to avoid interference with the slide beam 58 during retraction. This enables the device to tuck neatly into the drive compartment 70 while in the fully retracted position. This is but one feature which allows the mechanism to be located external to the confines of the RV parent frame and thus easily repairable and replaceable.

Cooperating to form the drive compartment 70, the slide-out frame 50 is slidably engaged with the main frame 12 (FIG.5). The proximal ends of the three lateral slide beams 52, 54 and 56 are received within the open end of the respective tubular cross members 24, 26 and 28, with the slide beams rolling over the respective roller support assemblies 34, 35 and 36. It will be appreciated that the sliding beams and the tubular cross beams are of steel construction and of sufficient strength to support the vertical levering force at the engagement area resulting from the cantilevered weight of the expanded slide-out frame. Further appreciated will be the placement of the roller assemblies at the cross beam openings to provide cantilever support for the slide beams during expansion and retraction to facilitate smooth operation thereof.

The drive mechanism 80 is installed within the drive compartment 70 laterally, perpendicular to the two longitudinal support beams 58 and 16. Bolted to the inward facing surfaces of the two longitudinal support beams, the mounting angles 94, 95, 96 and 97 provide a mounting interface. The predetermined stroke length, together with stop bolts 68, prevents the frames from disengaging.

Operation of the scissors actuated trailer slide-out begins by setting the power switch in the "extend" position, thus activating the motor 122 in a "forward" state, rotating the drive screw 126 clockwise to threadably draw the pivot pin 119 toward the pin 118. This action pivotally collapses the connected scissors links longitudinally, causing the scissors frame 82 to extend, thereby forcing the slide-out frame 50 outward from the RV. Once the room reaches the desired degree of extension, the switch is set to the "neutral" position, where the power to the motor is effectively turned off. To contract the slide-out, the switch is set to the "contract" position, which provides a voltage of negative polarity to the motor, thereby causing it to supply reverse rotational power to the drive screw. Rotating counter-clockwise, the drive screw threadably forces the scissors pivot pins 118 & 119 apart, thus contracting the scissors framework, and thereby pulling the slide-out inward towards the RV frame. Once fully contracted, the switch is once again set to the "neutral" state.

Figure 6:
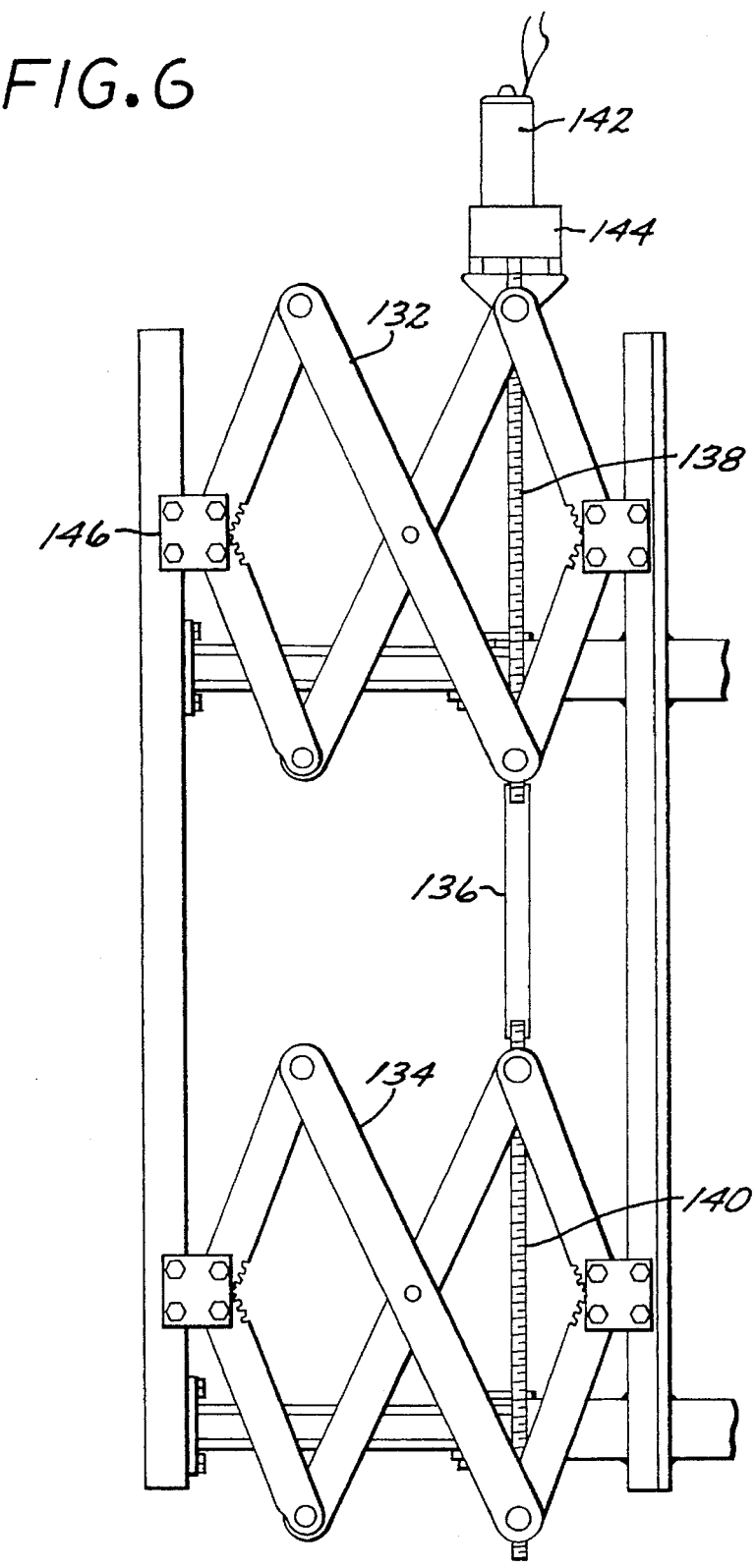
FIG. 6 is an elevated view of an alternative embodiment of the present invention taken substantially along line 5—5 of FIG. 1.

As illustrated in FIG. 6, an alternative embodiment of the present invention provides for "ganging" two or more drive mechanisms 132 and 134 together in a parallel fashion through use of a drive shaft 136 coupling two drive screws 138 and 140 together. One motor 142 and gear reduction assembly 144 would drive both screws. This embodiment (FIG. 6) substitutes the angled brackets for flat plates 146 designed to be mounted on the upper surface of the longitudinal support beams. For optimal performance, the mechanism is best installed along the lateral centerline of the drive compartment. In this way, uneven seizing of the slide-out frame during expansion and contraction is minimized. Such an arrangement is highly advantageous for large slide-out rooms where the longitudinal length can exceed twenty feet. The dual nature of the "ganged" mechanisms provide balanced loading and smooth sliding capability as well as added lateral support therebetween.

Those skilled in the art will appreciate that removal of the drive mechanism is easily accomplished by merely removing bolt pairs 102, 103, 104 and 105. This mounting scheme is possible because the slide-out frame requires no structural support from the drive mechanism, thus allowing a minimum amount of attachment for the device to function. Countering of any lateral stresses and cantilevering forces are conveniently provided for in the slide-out frame design. Because of the simple securing scheme, installation of the device may be performed without having to remove any OEM equipment previously installed.

Further appreciated will be the stowing capability and accessibility of the drive mechanism when not in use. Fully residing within the drive compartment formed by the slide-out frame and main frame, the drive kit is easily accessible whether extended or contracted. Current mechanisms provided as OEM equipment are often installed deep within the parent RV main frame, necessitating hours of labor costs just to gain access to repair the devices. The present invention, however, reduces the costs of maintenance by eliminating time spent disassembling other mechanisms for access thereto.

Being of a unitized, modular nature, the drive mechanism of the present invention also serves to reduce maintenance costs by providing a separate, removable, replaceable unit that may be easily serviced without having to resort to full replacement of the slide-out frame assembly. Additionally, such modular capability allows for alternatives in drive kit designs and capabilities which may be installed within a given drive compartment to provide the same overall function.

From the foregoing, it will be appreciated that the scissors actuated trailer slide-out of the present invention provides a convenient, low cost means of expanding and retracting an RV slide-out room. Due to its extruded nature from the RV parent frame, the drive mechanism may be installed in an "OEM" or aftermarket fashion. In addition, by being conveniently tucked away in the drive compartment, the entire device is completely and easily accessible, making repairs and replacement less costly.

While several forms of the invention have been illustrated and described, it will also be apparent that various modifications can be made without departing from the spirit and scope of the invention.

What is claimed is:

1. A recreational vehicle slide-out room apparatus comprising:
   a main frame formed with at least one longitudinal main beam and a pair of open ended, tubular cross beams;
   a slide-out frame including a pair of slide beams received telescopically in said tubular cross beams and extendable therefrom, said slide-out frame further including a longitudinal slide-out beam carried from the free ends of said slide-out beams, said main and longitudinal slide-out beams cooperating to form therebetween a drive compartment;
   a lazy tongs scissors drive linkage received in said compartment and including scissor channels pivotally connected together for pivoting to expand said linkage to an extended position and to retract said linkage to a retracted position, said channels being formed to form at the lateral opposite ends of said linkage respective pivot anchor ends;
   respective anchor plates pivotally mounted to the respective pivot anchor ends and disposed adjacent the respective said main beam and longitudinal slide-out beam;
   means of mounting said anchor plates to the respective said main beam and longitudinal slide-out beam;
   a threaded drive shaft coupled with said linkages and rotatable in opposite directions to selectively extend and retract said linkage;
   a drive device for driving said drive shaft in said opposite directions
   whereby said drive device may be operated to selectively rotate said drive shaft in one direction to expand said linkage to apply force between said main and slide-out beams to drive said longitudinal slide-out beam away from said main beam.

2. A recreational vehicle slide-out room apparatus according to claim 1 wherein:
   said main frame tubular cross beams include roller assemblies for sliding movement thereon having, respectively, a cylindrical roller, support plates, and an axle, said rollers coaxially interposed with said axle between said support plates.

3. A recreational vehicle slide-out room apparatus according to claim 1 wherein:
   said lazy tongs drive linkage includes a scissors linkage sized and configured for receipt in said drive compartment to extend and retract laterally and includes respective main frame and slide-out frame mounting plates mounted at the laterally opposite ends thereof;
   said drive shaft is mounted on said linkage; and
   said drive device includes a reversible drive motor mounted on said linkage and coupled with said drive shaft and operable to selectively drive said shaft in first one direction to extend said linkage and then in the opposite direction to contract said linkage whereby said linkage may be positioned in said compartment and said respective main and longitudinal slide-out beams so that said drive motor may be operated to rotate in one direction to extend said longitudinal slide-out beam away from said main beam and may be selectively operated to rotate said shaft in the opposite direction to contract said linkage.

4. A recreational vehicle slide-out room apparatus according to claim 3 wherein:
   said scissors linkage includes a main pair of scissors links of a predetermined length and pivotally connected together medially and formed with respective free ends and respective pairs of end links of a predetermined length pivotally connected on respective one ends to the respective said free ends and pivotally connected on their respective opposite ends in close spaced relation to the respective said mounting plates.

5. A recreational vehicle slide-out room apparatus according to claim 3 wherein:
   said drive shaft projects parallel to said main beam and is rotatably carried from one pair of the respective free ends of said main scissors links.

6. A recreational vehicle slide-out room apparatus according to claim 3 wherein:

said drive device includes an electric 12 VDC reversible motor.

7. A recreational vehicle slide-out room apparatus according to claim 3 and including:

pairs of mounting flanges disposed on the opposite sides of the lateral ends of said linkage and including respective pivot flanges formed with pivot bores and mounting flanges defining said mounting plates, said mounting flanges including mounting bores;

mounting bolts for extension through said mounting bores to mount the respective said mounting flanges from the respective said main and longitudinal slide-out beams; and pivot pins projecting through said pivot bores and the respective said ends of said linkage to pivotally connect the respective said flanges to said linkage to form said linkage mounting flange, drive shaft and drive motor as a self contained unit for installation in said compartment as a unit for mounting of said mounting flanges to the respective said main and longitudinal slide-out beams.

8. A drive kit for installation in a horizontal drive compartment formed between a slide-out frame and a main frame, and formed on opposite sides with respective longitudinal main and longitudinal slide-out beams to extend a slide-out room horizontally laterally from said main frame of a recreational vehicle, said kit comprising;

a lazy tongs scissors linkage sized and configured for receipt in said horizontal drive compartment to extend and retract laterally and having respective main frame and slide frame mounting plates mounted at the laterally opposite ends thereof;

a drive shaft mounted on said linkage and rotatable in opposite directions to extend and retract said linkage;

a reversible drive motor mounted on said linkage and coupled with said drive shaft and operable to selectively drive said shaft in first one direction to extend said linkage and then in the opposite direction to contract said linkage whereby said kit may be positioned in said compartment and said respective main frame and longitudinal slide-out frame mounting plate secured to the respective main and longitudinal slide-out beams so that said drive motor may be operated to rotate in one direction to extend said linkage to extend said longitudinal slide-out beam away from said main beam and may be selectively operated to rotate said shaft in the opposite direction to contract said linkage.

9. A drive kit for installation in a drive compartment according to claim 8 wherein:

said scissors linkage includes a main pair of scissors links of a predetermined length and pivotally connected together medially and formed with respective free ends, respective pairs of end links of a length equal one half said predetermined length, pivotally connected on respective one ends to the respective said free ends and pivotally connected on their respective opposite ends in close spaced relation to the respective said mounting plates.

10. A drive kit for installation in a drive compartment according to claim 8 wherein:

said main beams include roller assemblies for sliding movement thereon having, respectively, a cylindrical roller, support plates, and an axle, said rollers coaxially interposed with said axle between said support plates.

11. A drive kit for installation in a drive compartment according to claim 8 wherein:

said drive shaft projects parallel to said main beam and is rotatably carried from one pair of the respective free ends of said main scissors links.

12. A drive kit for installation in a drive compartment according to claim 8 wherein:

said drive motor is in the form of an electric drive motor.

13. A drive kit for installation in a drive compartment according to claim 12 wherein:

said drive motor includes a 12 VDC reversible motor.

14. A drive kit as set forth in claim 8 that includes:

pairs of mounting flanges disposed on the opposite sides of the lateral ends of said linkage and including respective pivot flanges formed with pivot bores and mounting flanges defining said mounting plates, said mounting flanges including mounting bores;

mounting bolts for extension through said mounting bores to mount the respective said mounting flanges from the respective said main and longitudinal slide-out beams; and pivot pins projecting through said pivot bores and the respective said ends of said linkage to pivotally connect the respective said flanges to said linkage to form said linkage mounting flange, drive shaft and drive motor as a self contained unit for installation in said compartment as a unit for mounting of said mounting flanges to the respective said main and longitudinal slide-out beams.

15. A drive kit for installation in a drive compartment formed between the main frame and longitudinal slide-out frame of a recreational vehicle formed on opposite sides with a respective main beam and a longitudinal slide-out beam, said kit comprising:

a plurality of lazy tongs scissors linkages in said compartment interposed between said beams and mounted at the opposite ends to said beams and extendable to extend said longitudinal slide-out beam away from said main beam;

drive screws mounted on the respective said linkages and rotatable to extend and retract the respective said linkages;

a drive shaft interconnected between said drive screws thereby joining said drive screws; and a reversible drive motor mounted on one of said drive screws and operable to selectively drive said screws in first one direction to extend said linkages and then in the opposite direction to contract said linkages whereby said kit may be positioned in said compartment between said main frame and said longitudinal slide-out frame, secured to the respective main and longitudinal slide-out beams so that said drive motor may be operated to rotate in one direction to extend said linkages to extend said longitudinal slide-out beam away from said main beam and may be selectively operated to rotate said screw in the opposite direction to contract said linkages.

16. The drive kit as recited in claim 15 wherein:

said interconnected drive screws include a distal end, said motor coupled to said distal end.

* * * * *